(12) United States Patent
Pfeil et al.

(10) Patent No.: US 8,882,318 B2
(45) Date of Patent: Nov. 11, 2014

(54) PERIPHERAL ILLUMINATION DEVICE FOR A VEHICLE COMPONENT

(75) Inventors: Marcus Pfeil, Winkelhaid (DE); Elena Justus-Bischler, Vilsbiburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/600,866

(22) Filed: Aug. 31, 2012

(65) Prior Publication Data

US 2013/0058115 A1 Mar. 7, 2013

(30) Foreign Application Priority Data

Sep. 2, 2011 (DE) .......................... 10 2011 112 320

(51) Int. Cl.
*B60Q 3/02* (2006.01)
(52) U.S. Cl.
USPC .......................... 362/511; 362/490; 362/580
(58) Field of Classification Search
USPC ......... 362/490, 493, 511, 551, 555, 588, 559, 362/576, 580, 581
See application file for complete search history.

(56) References Cited

U.S. PATENT DOCUMENTS

| | | | | |
|---|---|---|---|---|
| 3,781,537 | A | * | 12/1973 | Ramsey .......................... 362/559 |
| 5,400,225 | A | | 3/1995 | Currie |
| 5,465,194 | A | * | 11/1995 | Currie .......................... 362/551 |
| 5,959,844 | A | | 9/1999 | Simon et al. |
| 6,666,571 | B2 | | 12/2003 | Becher et al. |
| 6,772,559 | B1 | | 8/2004 | Bouamra et al. |
| 7,213,952 | B2 | | 5/2007 | Iwai |
| 8,215,810 | B2 | | 7/2012 | Welch, Sr. et al. |
| 2009/0161378 | A1 | * | 6/2009 | Enz .............................. 362/511 |

FOREIGN PATENT DOCUMENTS

| | | |
|---|---|---|
| DE | 94 22 405 U1 | 8/2001 |
| DE | 101 34 641 A1 | 5/2003 |
| DE | 103 41 884 B4 | 4/2005 |
| DE | 699 17 485 T2 | 5/2005 |
| DE | 10 2005 013 837 A1 | 10/2005 |
| DE | 11 2008 002 935 T5 | 9/2010 |
| DE | 102009011708 | 9/2010 |
| EP | 1 052 145 | 11/2000 |
| EP | 1 903 359 A2 | 3/2008 |
| EP | 2 287 042 | 2/2011 |
| JP | 2010-120604 | 6/2010 |
| WO | WO 2007/047304 | 4/2007 |

* cited by examiner

*Primary Examiner* — Y My Quach Lee
(74) *Attorney, Agent, or Firm* — Henry M. Feiereisen LLC

(57) ABSTRACT

A peripheral illumination device for a vehicle component includes at least one light guide, and an enclosure for guiding the at least one light guide. The at least one light guide is securely mounted in the enclosure via a fixed support at a predefined location and has two ends which are movably mounted in relation to the enclosure.

15 Claims, 1 Drawing Sheet

PERIPHERAL ILLUMINATION DEVICE FOR A VEHICLE COMPONENT

CROSS-REFERENCES TO RELATED APPLICATIONS

This application claims the priority of German Patent Application, Serial No. 10 2011 112 320.6, filed Sep. 2, 2011, pursuant to 35 U.S.C. 119(a)-(d), the content of which is incorporated herein by reference in its entirety as if fully set forth herein.

BACKGROUND OF THE INVENTION

The present invention relates to a peripheral illumination device, especially for a vehicle component, and to a vehicle equipped with such a peripheral illumination device.

The following discussion of related art is provided to assist the reader in understanding the advantages of the invention, and is not to be construed as an admission that this related art is prior art to this invention.

Peripheral illumination is used to date for objects such as speakers, pushbuttons, cup holders, etc. Normally, this kind of illumination involves a ring-shaped Plexiglas light guide having typically incorporated therein two LEDs. The light guide is hereby rigidly mounted in proximity of a structure that should be illuminated or accentuated, using clips. This allows a routing of a light guide about a surface area in the order of about 200 mm times 150 mm.

The vehicle interior encounters oftentimes temperatures between −40° C. and +80° C. Such severe temperature fluctuations cause installed structures and peripheral illuminations to expand differently. As the illuminations are rigidly mounted to the structures that are illuminated, temperature stress is encountered, causing destruction or defects of the interacting parts. This stress is also caused in light-conducting elements as a result of different thermal expansion of the assembled materials. Illuminations that wrap around large-area structures, for example a sunroof or large roof, require the illuminations to wrap around surface areas of about 1500 mm times 1000 mm. Thermal expansions encountered at such dimensions cannot be compensated in the absence of additional measures. Different building materials have varying thermal expansion coefficient, causing substantial differences in expansion when exposed to high or very low temperatures and ultimately leading to mechanical failure of the structural parts—e.g. rupture of a light guide—which in turn leads to malfunction of the structural parts or even to complete destruction. Thus, conventional models and methods are inadequate to provide peripheral illumination of large-area vehicle components.

It would therefore be desirable and advantageous to provide an improved peripheral illumination device for vehicle components to obviate prior art shortcomings and to enable also a wrap-around lighting of large objects.

SUMMARY OF THE INVENTION

According to one aspect of the present invention, a peripheral illumination device for a vehicle component includes at least one light guide, and an enclosure guiding the at least one light guide, wherein the at least one light guide is securely mounted in the enclosure at a predefined location and has two ends which are movably mounted in relation to the enclosure.

An illumination device according to the present invention is provided to frame a vehicle component, in particular one of large dimensions. The light guide can be securely fixed in the enclosure by bonding, welding, or mechanical clamping. Both ends of the light guide, as viewed in length direction or its longitudinal extent, are movably mounted in relation to the surrounding enclosure. The fixed support of the light guide to the enclosure allows a precise positioning of the light guide in the enclosure, whereas the movable support on both ends enables the light guide to expand or move in relation to the surrounding enclosure. As a result, the different expansion of the light guide and the surrounding enclosure can be compensated through relative movements so that any temperature stress caused by the varying thermal expansion can be offset.

Positioning of the fixed support of the light guide may be selected in the enclosure in such a way that a respective light guide section, as defined by the part of the light guide end to the fixed support of the light guide, can be installed or arranged in an optimum manner. In this way, constructive restrictions of the structural parts can be taken into account.

According to another advantageous feature of the present invention, the light guide may be fixedly supported in midsection of the longitudinal extent of the light guide. A fixed securement of the light guide in midsection is especially beneficial when surrounding a symmetric structural part is involved because an expansion of the light guide sections on either side of the structural part is uniform in length direction of the light guide.

According to another advantageous feature of the present invention, the enclosure may be of single-piece construction. This simplifies manufacture and ensures a uniform illumination without any significant breaches in light conduction. A visible breach of the enclosure would be interpreted by an observer as rupture or defect in the illumination device.

According to another advantageous feature of the present invention, the enclosure may be made, at least in part, of transparent configuration. This is beneficial in those situations when illuminated sections are intended to direct the attention of an occupant to certain functions or parts of the vehicle. Advantageously, light guide sections of different transparency may be associated to different colors. As a result, objects or functions of the vehicle can be prioritized or organized through association to different colors. Thus, the color emitted by light guides and/or pertaining light sources can be freely selected. In addition, the colored configuration of the enclosure may satisfy predefined specifications.

According to another advantageous feature of the present invention, a plurality of light guides may be arranged in overlapping relationship. Routing more than one light guide through the enclosure enables a mounting of a plurality of light guides with different LEDs and thus realization of different colors. Moreover, the presence of several overlapping light guides within the same enclosure enhances reliability because in the event of malfunction of one light guide, another light guide may assume its function. Furthermore, the presence of several overlapping light guides allows also the provision of more complex enclosures of vehicle components. By dispersing several light guides in a same enclosure, with respective end portions of adjacent light guide overlapping, the longitudinal dimensions of the light guides can be kept short. As a consequence, thermal expansion of individual light guides is reduced and the overlapping arrangement of the light guides in the enclosure conveys the impression of a continuous, uniform light conduction and illumination.

According to another advantageous feature of the present invention, several overlapping light guides may be arranged movably relative to one another. As a result, the individual light guides are prevented from interfering with one another during thermal expansion and from exerting any mechanical force action upon one another. Such an arrangement increases flexibility in terms of material being used and characteristics of the peripheral illumination device.

According to another advantageous feature of the present invention, the at least one light guide and/or its enclosure may be made of Plexiglas, polymethyl methacrylate, or polycarbonate. Compared to conventional glass, such materials are more elastic and allow greater temperature expansions. Moreover, these materials do not splinter when mechanically damaged and lead to a lower risk of injury for vehicle occupants. Furthermore, these types of plastic are easy to process, inexpensive to produce, and can be recycled.

According to another advantageous feature of the present invention, the enclosure has a thermal expansion coefficient which can be less than a thermal expansion coefficient of the light guide. As a consequence, the ends of the light guides can be arranged near the surrounding enclosure, without any risk of displacement of the installed light sources from the enclosure. This saves space.

According to another advantageous feature of the present invention, at least one end of a light guide and/or or pertaining light source may be movably supported. Depending on the situation at hand, it may be necessary to connect the light sources, for example LEDs with pertaining coupling elements, with the light guide. This means that the end of a light guide has to be movably supported with the coupled light source. Therefore, it may be suitable to not only provide a movable support of the end of light guide so as to permit a relative movement in relation to its enclosure but also a movable support of the pertaining light source which is connected either firmly with the end of the light guide or loosely and which in turn permits a relative movement in relation to the end of the light guide. Depending on the demands at hand, loose and fixed supports of the light sources and respective ends of the light guides may, of course, be provided and combined.

A majority of vehicle components has a polygonal configuration. Accordingly, an illumination device according to the present invention may be configured of polygonal shape for a vehicle component.

According to another advantageous feature of the present invention, the light guide may be arranged along a straight portion of a polygon so as to produce an illumination device for a vehicle component of polygonal contour. As the light guide does not have to be routed around a corner, a configuration at an acute angle is possible. In this way, stress peaks are avoided which otherwise would be encountered if the arrangement had a curved configuration or the light guide had been firmly mounted at several locations.

According to another aspect of the present invention, a vehicle includes a vehicle component having a polygonal configuration, and a peripheral illumination device for the vehicle component, with the illumination device including at least one light guide; and an enclosure guiding the at least one light guide, wherein the at least one light guide is securely mounted in the enclosure at a predefined location and has two ends which are movably mounted in relation to the enclosure.

In accordance with the present invention, a rectangular sunroof and/or sunroof section of a vehicle roof for example can now easily be produced and equipped with an illumination device because the provision of a peripheral illumination device according to the present invention is especially beneficial in the event of vehicle components of single-piece construction. The ends of the light guides and their light sources and pertaining coupling elements can generally be installed easily in the sunroof or vehicle roof.

According to another advantageous feature of the present invention, the peripheral illumination device may include four light guides for a rectangular sunroof. The light guides are hereby respectively associated to the four straight sides of the rectangle, with each light guide being firmly mounted halfway of the respective rectangle side along the enclosure and the two ends of the each light guide in length direction thereof being floatingly supported outside the rectangle in the vehicle roof together with the light sources and their coupling elements. The individual light guides are thus routed in the area of a frame of the rectangular sunroof in the adjacent vehicle roof. As a result, the presence of a breach in the illuminated border is avoided in the area of the corners of the peripheral illumination device and the impression of a peripheral and evenly illuminated border is conveyed to the vehicle occupant.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
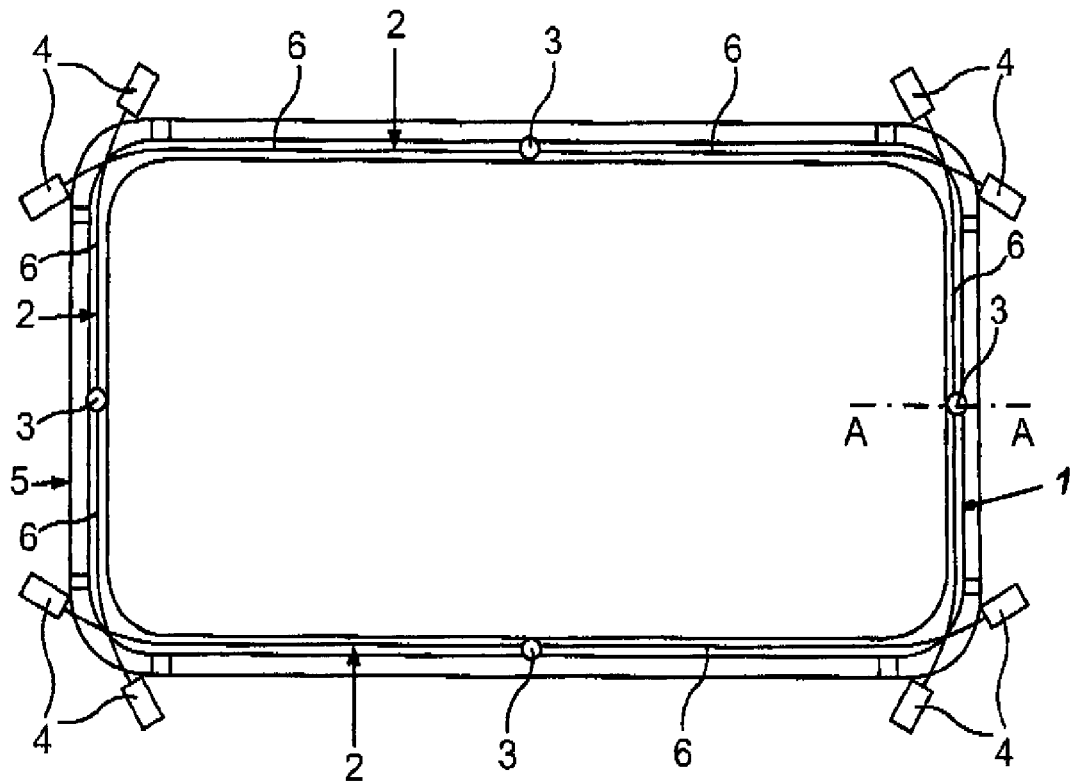
FIG. 1 is a schematic plan view of a section of a sunroof, having incorporated therein a peripheral illumination device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown, by way of example, a schematic plan view of a section 5 of a rectangular sunroof in a vehicle roof, having incorporated therein a peripheral illumination device according to the present invention. The illumination device includes an enclosure 1 which extends along four sides of the rectangular sunroof section 5 and has an interior to accommodate four conventional light guides 2. Of course, the number of light guides 2 inside the enclosure 1 is not limited to four but may be increased or decrease to best suit the situation at hand. Although not shown in the drawing, the enclosure 1 may also include a number of light guides which overlap one another and are arranged in parallel relation or intersecting relation.

The four light guides 2 are respectively arranged at the four sides of the rectangular sunroof section 5 and firmly secured by fixed supports 3, respectively. The fixed supports 3 also center the light guides 2 in midsection and formfittingly within the enclosure 1. Each light guide 2 extends loosely in the enclosure 1 from its fixed support 3 in length direction to its two ends.

The portion of the light guide 2 between an end and the fixed support 3 is defined as light guide section 6. The arrangement of the fixed support 3 of the light guide 2 allows a precise determination of the extent of thermal expansion of the individual light guide sections 6. In this way, an available installation space of the LEDs can be utilized in an optimum manner. The respective ends of the light guide 2 or light guide sections 6 extend beyond the periphery of the enclosure 1 to a LED feed-in element which is operatively connected to a LED light source 4. The light sources 4 secured to the ends of the light guide 2 are loosely or floatingly supported in the vehicle roof, although it is, of course, also conceivable to securely fix the light sources 4 (not shown). The loose arrangement of the ends of the light guide 2 and the light sources 4 provides a compensating floating support to thereby allow different thermal expansions of the enclosure 1 and the light guides 2 accommodated in the enclosure 1.

The enclosure 1 is made of a material having a thermal expansion coefficient which is less than the thermal expansion coefficient of a material of the light guides 2. As a result, it is ensured that the thermal expansion of the light guide 2 is greater than the one of the enclosure 1 and that the feeding light sources 4 cannot be "swept away" by the ends of the light guide 2. In the event the thermal expansion coefficient of the enclosure 1 exceeds the one of the light guides 2, enough clearance should be made available between the border of the enclosure 1 and the light source 4 secured to the end of the light guide 2. In the peripheral illumination device shown in FIG. 1, the ends of the light guide 2 is routed into the vehicle roof at the corners of the illumination system.

The light guides 2 may be made of any conventional light conducting material. Examples of material for the light guides 2 include Plexiglas, polymethyl methacrylate, or polycarbonate. The enclosure 1 is predominantly made of translucent material, such as Plexiglas, polymethyl methacrylate, or polycarbonate. To produce an illumination device that is perceived uniform, the enclosure 1 may include a diffusing glass 11 which is oriented to and visible from the vehicle interior.

Figure 2:
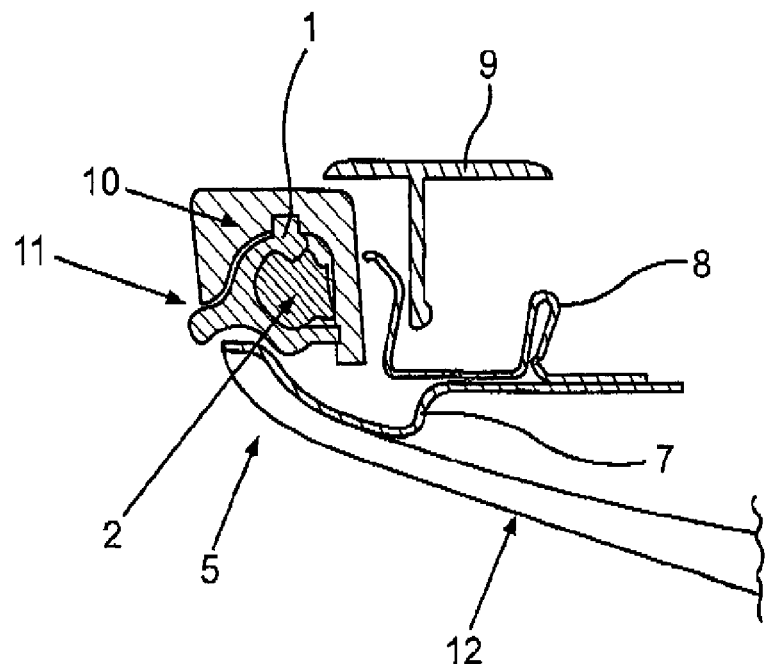
FIG. 2 is a detailed sectional view of the sunroof section, taken along the line A-A in FIG. 1.

FIG. 2 shows a detailed sectional view of the sunroof section 5, taken along the line A-A in FIG. 1, to illustrate a securement of the peripheral illumination device of the sunroof section 5 in a vehicle roof. The sunroof section 5 includes below the vehicle roof a connection element 9 and two sheet-metal retainers 7, 8, with the peripheral illumination device being clamped there between. The light guide 2 is surrounded by the enclosure 1 and received in an elastic top rail 10 which is provided to seal the peripheral illumination device to the outside. The top rail 10 is clamped jointly with the accommodated enclosure 1 in the two retainers 7, 8. Visible from the vehicle interior is only the diffusing glass 11 of the peripheral illumination device. The diffusing glass 11 is arranged between the enclosure 1 and the vehicle interior and can be formed in one piece with the enclosure 1. The retainer 7 of the vehicle roof is provided with a decorative fabric 12 on a side facing the vehicle interior. The entire peripheral illumination device is covered by the vehicle roof, except for the diffusing glass 11. In addition to providing a seal of the illumination device, the top rail 10 also provides attenuation when the vehicle is subjected to intense shocks which could damage the peripheral illumination device.

By using the fixed support 3, the light guide 2 is firmly anchored in the enclosure 1 and the position of the fixed support 3 is determinative for the direction and degree of expansion of the light guide section 6 of the light guide 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A peripheral illumination device for a vehicle component, comprising:
   at least one light guide; and
   an enclosure guiding the at least one light guide,
   wherein the at least one light guide is securely mounted in the enclosure at a predefined location by a fixed support and has two ends, wherein the light guide extends loosely in the enclosure from the fixed support in length direction to the two ends and the two ends are movably mounted in relation to the enclosure.

2. The illumination device of claim 1, wherein the at least one light guide has a longitudinal extent, said predefined location of the at least one light guide being in midsection of the longitudinal extent.

3. The illumination device of claim 1, wherein the enclosure is of single-piece construction.

4. The illumination device of claim 1, wherein the enclosure is, at least in part, of transparent construction.

5. The illumination device of claim 1, wherein the at least one light guide is configured to radiate light of a predetermined first color, and further comprising a further light guide configured to radiate light of a second color which differs from the first color.

6. The illumination device of claim 1, further comprising a plurality of said light guides arranged in overlapping relationship.

7. The illumination device of claim 6, wherein the plurality of overlapping light guides are arranged movably relative to one another.

8. The illumination device of claim 1, wherein the at least one light guide is made of Plexiglas, polymethyl methacrylate, or polycarbonate.

9. The illumination device of claim 1, wherein the enclosure is made of Plexiglas, polymethyl methacrylate, or polycarbonate.

10. The illumination device of claim 1, wherein the enclosure has a thermal expansion coefficient which is less than a thermal coefficient of the at least one light guide.

11. The illumination device of claim 1, further comprising two light sources respectively secured to the ends of the at least one guide.

12. A vehicle, comprising:
    a vehicle component having a polygonal configuration; and
    a peripheral illumination device for the vehicle component, said illumination device including at least light guide; and an enclosure guiding the at least one light guide, wherein the at least one light guide is securely mounted at a predefined location by a fixed support and has two ends, wherein the light guide extends loosely in the enclosure from the fixed support in the length direction to the two ends and the two ends are movably mounted in relation to the enclosure.

13. The vehicle of claim 12, wherein the at least one light guide is arranged along a straight section of the polygonal configuration of the vehicle component.

14. The vehicle of claim 12, wherein the vehicle component is a rectangular sunroof or a sunroof section of a vehicle roof.

15. The vehicle of claim 12, wherein the peripheral illumination device includes four of said light guide.

* * * * *